United States Patent [19]

Vinciguerra

[11] Patent Number: 4,516,908
[45] Date of Patent: May 14, 1985

[54] POWER STAGE OF A GAS TURBINE

[75] Inventor: Constantino Vinciguerra, Florence, Italy

[73] Assignee: Nuovo Pignone S.p.A., Florence, Italy

[21] Appl. No.: 366,482

[22] Filed: Apr. 8, 1982

[30] Foreign Application Priority Data

Apr. 17, 1981 [IT] Italy ............................ 21243 A/81

[51] Int. Cl.³ ............................................. F01D 5/30
[52] U.S. Cl. ............................ 415/122 R; 415/122 A; 415/212 R; 415/219 R; 415/DIG. 3
[58] Field of Search ................. 415/DIG. 1, 201, 118, 415/122 R, 122 A, 212 R, DIG. 3, 219 R, 170 R; 29/452, 446; 60/39, 161; 416/198 A; 74/421 R, 421 A

[56] References Cited

U.S. PATENT DOCUMENTS

| | | | |
|---|---|---|---|
| 2,695,131 | 11/1954 | Price | 415/201 |
| 3,070,348 | 12/1962 | Vogel | 416/198 A |
| 3,203,180 | 3/1960 | Price | 415/115 |
| 3,625,634 | 12/1971 | Stedfeld | 416/198 A |
| 3,740,162 | 6/1973 | Tuomaala | 415/201 |
| 3,749,362 | 7/1973 | O'Connor et al. | 29/452 |
| 3,749,516 | 7/1973 | Samurin | 416/198 A |
| 3,844,023 | 10/1974 | Surribas et al. | 29/452 |
| 3,937,593 | 2/1976 | Jeyes et al. | 416/241 B |
| 3,976,399 | 8/1976 | Schmoch | 416/198 A |
| 3,999,376 | 12/1976 | Jeryan et al. | 416/241 B |

FOREIGN PATENT DOCUMENTS 322781 12/1929 United Kingdom ................ 415/201

*Primary Examiner*—Samuel Scott
*Assistant Examiner*—Brian J. Bowman
*Attorney, Agent, or Firm*—Hedman, Gibson, Costigan & Hoare

[57] ABSTRACT

A gas turbine, in which the rotor (9) of the power stage (5) is supported by a hollow shaft (10) in a cantilever fashion. The hollow shaft (10) has a pair of forged hollow frustoconical ends (11, 12) made of case-hardened and milled steel supported by bearings (19, 20, 20') and connected together by a hollow central tube (13). A stud (15) extends through and from the hollow shaft (10) and has threaded ends (15', 15"). The threaded end (15') releasably secures one end of the hollow shaft (20) into a correspondingly threaded portion (16) of the rotor (9) and the threaded end (15") is threaded into a nut (17) which cooperates with the other end of the hollow shaft (10) to releasably tighten the one end of the hollow shaft (10) to the rotor (9) and place the stud (15) under tension. The turbine also has a 3-cam system (26) which can be inserted into a circumferential groove (25) of the rotor (9) to centrally support the rotor (9) as the stud (15) is released, and gear means (22, 23, 24) for taking the drive from the power shaft (10) without increasing the bulk of the assembly.

6 Claims, 3 Drawing Figures

POWER STAGE OF A GAS TURBINE

This invention relates to improvements in, or relating to, the power stage of a gas turbine, and, more particularly, it relates to a gas turbine which provides for the convenient and quick overhauling and reassembling of its power stage.

In present gas turbines used on land, the rotor of the power stage, which generally consists of two or three blade-carrier disks, is supported in an overhanging manner by a solid shaft which makes up an entity with said disks and is supported, in its turn, by bearings which, by necessity, must be made in two half-shells for mounting purposes.

This approach, however, has a number of short-comings. For example, an inspection of the rotor blades or overhauling of the shaft, which is integral with the blade carrier disks, the operations are very cumbersome and time consuming because of the considerable extension of the assembly in the longitudinal direction.

Another drawback is the difficulty of replacing the shaft bearings when they have been damaged, particularly for the first bearing which is completely concealed in the diffusor positioned at the remote end of the last set of blades.

Also, as outlined above, the bearings must be made in two half-shells and this results in an intricate construction.

Still another problem is the considerable weight of the solid shaft, which, to reduce critical speeds, must be supported by comparatively closely spaced bearings, so that the solid shaft must, of necessity, be short. This condition places limitations on the design of the disk-shaft assembly from the point of view of the critical speeds.

Lastly, inasmuch as the solid shaft must be a short one, the attendant bearing placed at the most remote location from the rotor must be supported in correspondence with the underlying diffusor and thus by a structure which cannot be sturdy and resistant enough to withstand axial thrusts. As a consequence it cannot be used as a supporting member for a speed multiplier adapted to draw appreciable power from the overlying shaft, such as is required for driving high-speed expansors for recovering the power from the exhaust gases of the turbine. Thus, the drive must be taken from an independent multiplying apparatus axially coupled to the tubeine shaft, the result being, a conspicuous increase in the bulk of the turbine.

An objective of the present invention is to obviate the drawbacks enumerated above by providing a gas turbine wherein the shaft and bearings assembly may quickly be connected to, and disconnected from, the rotor of the power stage of the turbine concerned.

This objective is substantially attained by a particular kind of hollow shaft which includes a frustoconical end inserted into a corresponding space present in the assembly of the rotor disks and to which the shaft is secured by a stud passed through the hollow space of the shaft, wherein the stud is threadably connected to either end of the rotor and is hydraulically tensioned and tightened by a nut active on and cooperating with the other and opposite end of the shaft.

More specifically, the gas turbine, which comprises, inter alia, a machine body and a power stage having a stator and a rotor with two or three blade-carrier disks is overhangingly supported by the power shaft of the invention which is mounted for rotation on bearings mounted on the machine body. The shaft is hollow and includes a pair of hollow forged frustoconical ends made of hardened and milled steel on its entire external surface connected together by a central tube into which the ends are inserted and snugly mounted. Further, one frustoconical end, in turn, is inserted in and snugly mounted into a corresponding axial hollow space of the rotor and is secured thereto by a stud which is passed through the hollow space of the shaft and which is threaded and screwed at the one end into a correspondingly threaded seat provided in the axial hollow space of the rotor. At its other ends the stud also is threaded and is hydraulically tensioned and tightened by a nut which is active upon its other threaded end and which cooperates with the other frustoconical end of the shaft.

The advantages of such an arrangement can be appreciated at a glance.

In the first place, the particular construction of the shaft with two hollow ends of hardened and milled steel connected by a central shank consisting of a tube fastened to said end pieces in a snug fit enables hard and milled surfaces to be obtained in the neighbourhood of the bearings which cannot be obtained, mainly for economical reasons with the heretofore used solid shaft. In addition, the shaft of the invention has considerable stiffness and is exceptionally lightweight. This latter fact permits the use of lengthy shafts with a corresponding increase in distance between bearings, while maintaining very satisfactory conditions at the critical speeds. Accordingly, the bearing opposite the rotor can be arranged on the turbine end in an area which is accessible and beneath which there is sufficient room for a sturdy box for supporting the shaft bearing. The box, moreover, can be used for supporting one or more secondary shafts in its interior which receive their drive from the power shaft by means of gear trains.

As a matter of fact, according to another feature of the present invention, the power shaft has, secured thereto in the vicinity of the bearing opposite to the rotor, a gear meshing with one or more gears keyed to as many secondary shafts supported for rotation in the interior of the structure of the machine body which supports the power shaft bearings.

Furthermore, the adoption of the central stud enables the shaft and the rotor to be quickly assembled and disassembled, by merely acting, with a double-acting hydraulic jack, upon the stud end opposite to the rotor which is a very convenient and accessible area.

More particularly, the double-acting hydraulic jack mounted on the free end of the shaft and connected by its ram to the stud, is operated in the sense of resiliently stretching the stud so as to facilitate the tightening (or the release) of the nut which has holes formed in its outer surfaces to permit the insertion of a wrench. Subsequently, the jack is actuated in the opposite sense, so as to slip the rotor outside the frustoconical shaft to free the rotor or even the rotor-stator assembly which thereafter can be secured to one another to appropriate temporary connecting means.

By doing so, the rotor-stator assembly can quickly and conveniently transferred to an appropriate workshop for upkeep, or even for replacement by another identical unit which is already in storage thereby drastically reducing to a negligible fraction the time and effort presently required.

As an alternative, it is also possible to overhaul the shaft-bearings assembly for inspection and replacement, by merely releasing the screw-threaded stud end on the rotor side and supporting the rotor and maintaining its centered position. The adoption of the central stud provides the additional benefit of considerable reliability for the connection between the shaft and the rotor, inasmuch as the stud is kept tightened during operation so that the shaft-rotor assembly is an entity just as in the present turbines, but, since it is very long, it is capable of storing a considerable amount of elasticity energy.

Lastly, the possibility thus afforded of easily dismantling the power shaft, enables the thrust bearing to be positioned on the side near the rotor. This is contrary to the approaches adopted heretofore, which required the thrust bearing to be positioned on the side opposite to the rotor, that is, in the area which was accessible because it was not possible to dismantle the shaft.

The novel location of the thrust bearing is such that the volume of oil required by such bearing can be conveyed into the very hot area near the rotor, so that the quantity of heat withdrawn therefrom can be increased and the reliability of the operation considerably improved.

Then, according to another feature of the present invention, the means for supporting the rotor in its centered position as the stud is loosened, includes a system of three or more supporting cams which are placed evenly spaced apart from each other about a circumferential groove formed in the end of the rotor. The cams are capable of being inserted into the groove by rotation and being supported for rotation by parallel horizontal supporting members secured to the machine body, and eccentrically connected to a single ganging ring arranged coaxially with the turbine rotor by connecting rods.

By doing so, manually rotating one of the three cams with the aid of an appropriate wrench until its cam nose is inserted in the rotor groove, a corresponding rotation of the ganging ring takes place as a result of the action of the connecting rod of the cam which has been rotated. The rotation of the ganging ring produces a corresponding rotation of the remaining cams, so that the remaining cams insert their noses into the groove and the rotor is thereby firmly supported.

The invention is now explained with reference to the accompanying drawings which show a preferred embodiment of the invention wherein technical and constructional changes are possible without departing from the scope of the present invention.

Figure 1:
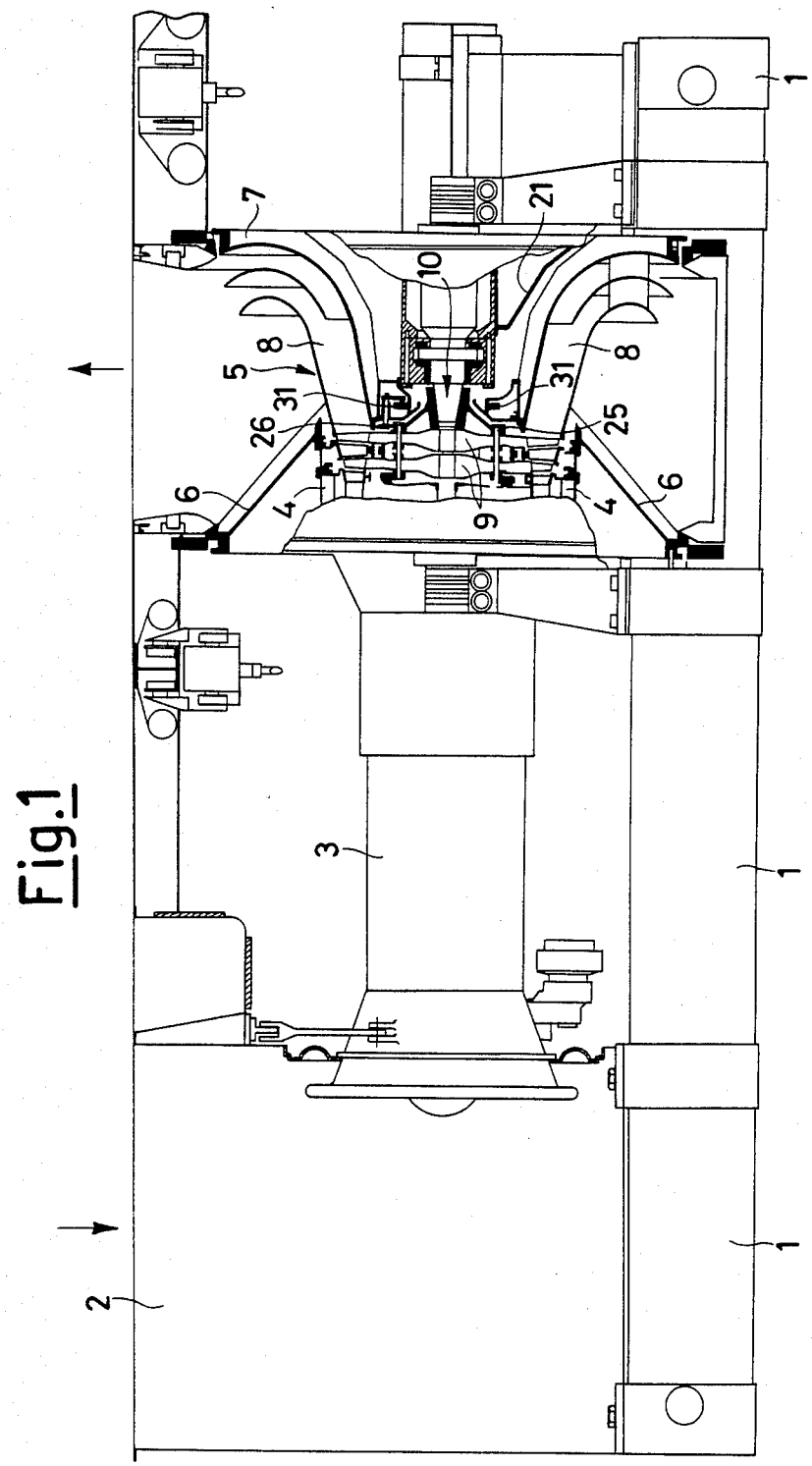
FIG. 1 is a longitudinal view, partly in cross-section, of a gas turbine in which the improvements of the invention have been introduced.

With reference to the drawings there is shown a gas turbine having a body 1 to which the air-intake box 2 is secured. The box 2 supports the front end of the gas generator 3 and the rear end of the generator 3 is secured to the stator casing 4 of the power stage 5 of the turbine. The stator casing 4 is flangedly connected to a supporting cone 6 which, in turn, is secured to an exhaust box having a vertical outlet 7 into which the cone 6 is completely inserted and to which the exhaust gases are fed by an annular conical diffuser 8. The rotor 9 of the power stage 5, which has been shown in the drawings as being composed of two blade-carrier disks, is supported in a centilever fashion by the power shaft 10. More specifically, the power shaft 10 is provided with two hollow frustoconical ends 11 and 12, respectively, best seen in FIG. 2, which are formed by forging and have their external surface made of case-hardened steal which are milled. The ends 11 and 12 are connected together by a central tube 13 which is mounted forcibly thereon.

Figure 3:
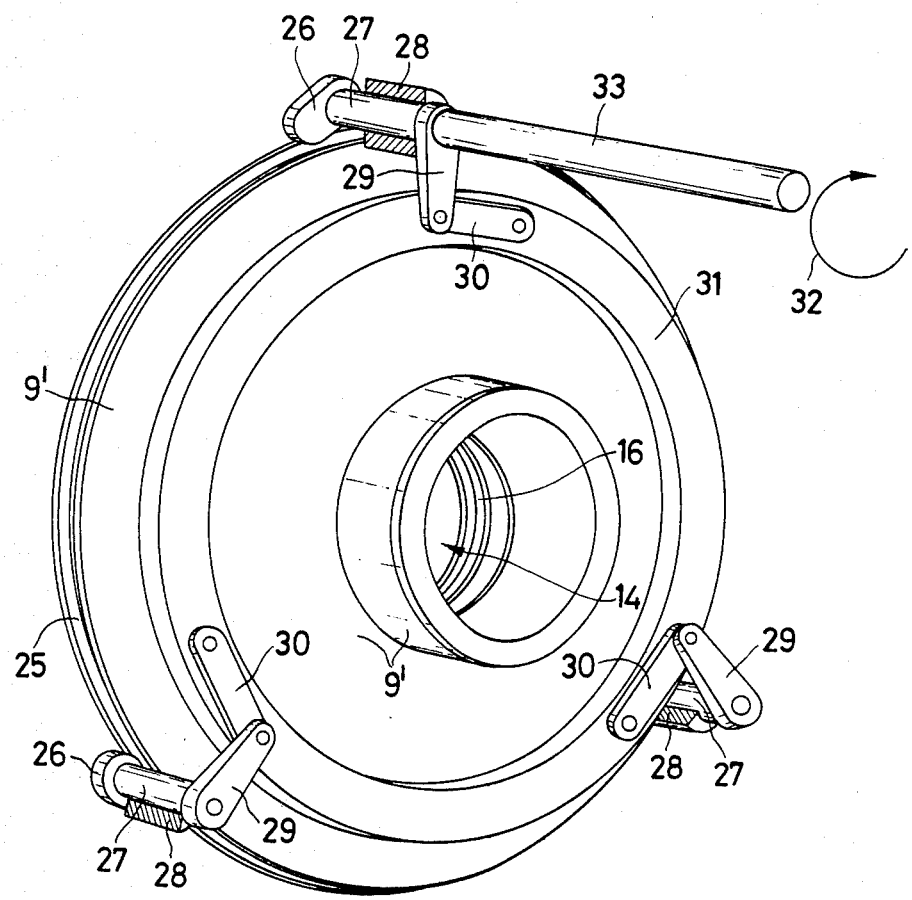
FIG. 3 is an enlarged perspective view of the particular system of the invention for supporting the rotor in its correct central position when the power shaft is disassembled.

The frustoconical end 11 of the shaft 10 is then inserted into a corresponding axial hollow space 14 (best seen in FIG. 3) formed in the hub 9' of the rotor 9, to which the shaft 10 is firmly secured by a stud 15. The stud 15 is passed through the interior of the hollow shaft 10 and is secured by threaded end 15' within a correspondingly threaded portion 16 (see FIG. 3) formed in the axial hollow space 14 of the hub 9'. The shaft 10 is maintained taught by the tension imparted thereto hydraulically by a jack and so held by a nut 17 which is active upon the other threaded end 15" of the stud 15, wherein the nut 17 cooperates with the front ends of the frustoconical end 12 of the shaft 10.

In order to make tightening and releasing easier, the nut 17 is provided with holes 18 in its outer circumference so that a wrench tip may be inserted therein.

Furthermore, the shaft 10 is supported for rotation by the two bearings 19 and 20 and by the thrust bearing 20'. These bearings are supported by the structure 21 of the body 1. Inasmuch as the hollow shaft 10 can be made long enough to emerge from the area of influence of the diffuser 8 the underlying structure 21 can be made robust and sturdy. The structure 21 can also be exploited for supporting secondary shafts 22 (one shaft only is shown in the drawing) which rotates therein and which receives their drive from the gear 23 secured to the power shaft 10. The gear 23 is in mesh with gears 24 (only one of these is shown in the drawing), which, in turn, are integral with said secondary shafts 22.

Finally, the hub 9' of the rotor 9 of the power stage 5 has a circumferential groove 25 (see FIG. 2 and FIG. 3) within which there are inserted, by rotation, the projecting portions of a set of supporting cams 26 (three cams are shown in the drawings), the arbors 27 of which are supported for rotation by corresponding parallel horizontal bearings 28 which are secured to the body 1.

Figure 2:
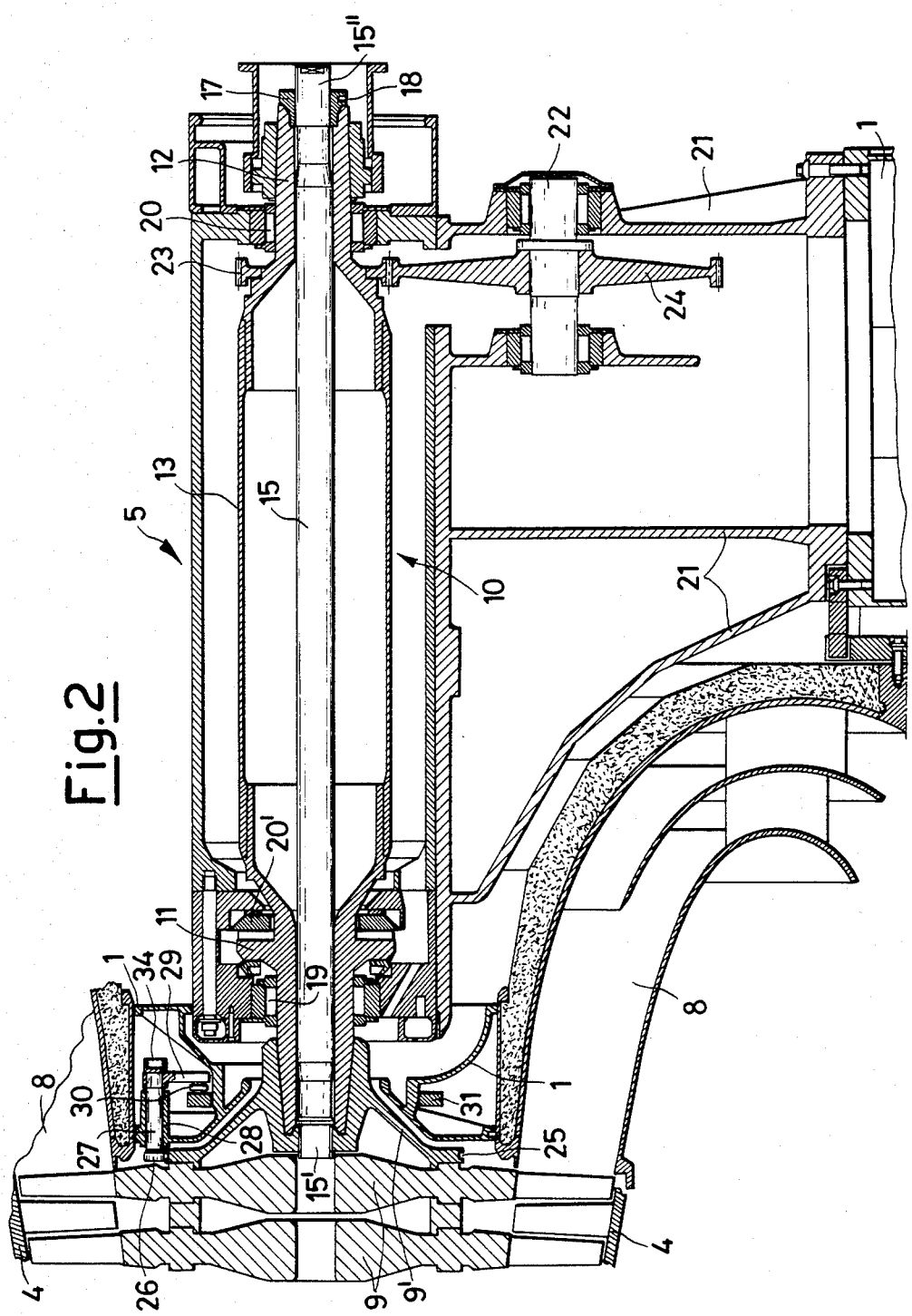
FIG. 2 is an enlarged cross-sectional view of the gas turbine shown in FIG. 1.

The arbors 27 of the cams 26 have short cranks 29 secured thereto which are pivoted by corresponding connecting links 30, to a single ganging ring 31 arranged coaxially with the power shaft 10 (see FIG. 2).

The supporting cams 26 are rotated together, by rotating, in the direction of the arrow 32, a wrench 33 (see FIG. 3) to be inserted in an appropriate chamber 34 (see FIG. 2) of one of the pivots 27 of the cams.

I claim:

1. A gas turbine having a body (1) and a power stage (5) therein including a stator (4) and a rotor (9) with a plurality of blade-carrier disks, comprising:

a hollow power shaft (10) of the power stage (5) which support the disks in a cantilever fashion, and wherein said shaft (10) includes a pair of frustoconical hollow forged ends (11, 12) made of case-hardened and milled steel on their surfaces and connected together by a hollow central tube (13), wherein one frustoconical end (11) is inserted into a corresponding axial space (14) of the rotor (9) and wherein the other frustoconical end (12) is supported by the body (10), a stud (15) extending through said hollow tube (13) and from said frustoconical ends (11, 12) having threaded ends (15', 15"), wherein one end (15') is releasably threaded into a correspondingly threaded portion (16) about the axial space (14) of the rotor (9) and wherein the other end (15") is threaded into a nut (17) which cooperates with the other frustoconical end (15') to tighten and place said stud (15) under tension, bearing means (19, 20, 20') within the body 1 which support said hollow shaft (10) at said case-hardened and milled frustoconical ends (11, 12), gear means (22, 23, 24) which are connected to said shaft (10) for taking the drive therefrom, and cam means (26) on the body 1 which engage and support the rotor (9) in its correct central position as said stud (15) is released from the threaded portion (16) in the axial hollow space (14).

2. The gas turbine according to claim 1, wherein said bearing means includes a thrust bearing (20') which supports said rotatable shaft (10) at the rotor end thereof.

3. The gas turbine according to claim 1, wherein said nut (17) has holes in its outer circumference to facilitate engagement by a wrench for releasing and tightening said shaft 10 from and to the rotor (9).

4. The gas turbine according to claim 1, wherein the turbine has a diffuser (8) downstream of the rotor (9) and said hollow power shaft (10) is positioned within and extends downstream of the diffuser (8) for support thereof by the body (1).

5. A gas turbine according to claim 1, wherein said cam means for supporting the rotor (9) in its correct central position when said stud (15) is released includes a system having a plurality of supporting cams (26) arranged equally spaced apart from each other about a circumferential groove (25) on the outer end of the rotor (9), said cams (26) being insertable by rotation into said groove (25) and being supported for rotation by parallel horizontal bearings (28) secured to the body (1) and eccentrically connected to a single ganging ring (31) arranged coaxially with the rotor (9) by interconnecting cranks (29,30).

6. A gas turbine according to claim 1, wherein said gear means for taking the drive from said power shaft (10) includes a gear (23) keyed to said power shaft (10) adjacent to the bearing (20) opposite to the rotor (9), and one or more gears (24) meshing with said gear (23) and integral with corresponding secondary shafts (22) supported for rotation within the machine body (1).

* * * * *